Patented Oct. 29, 1935

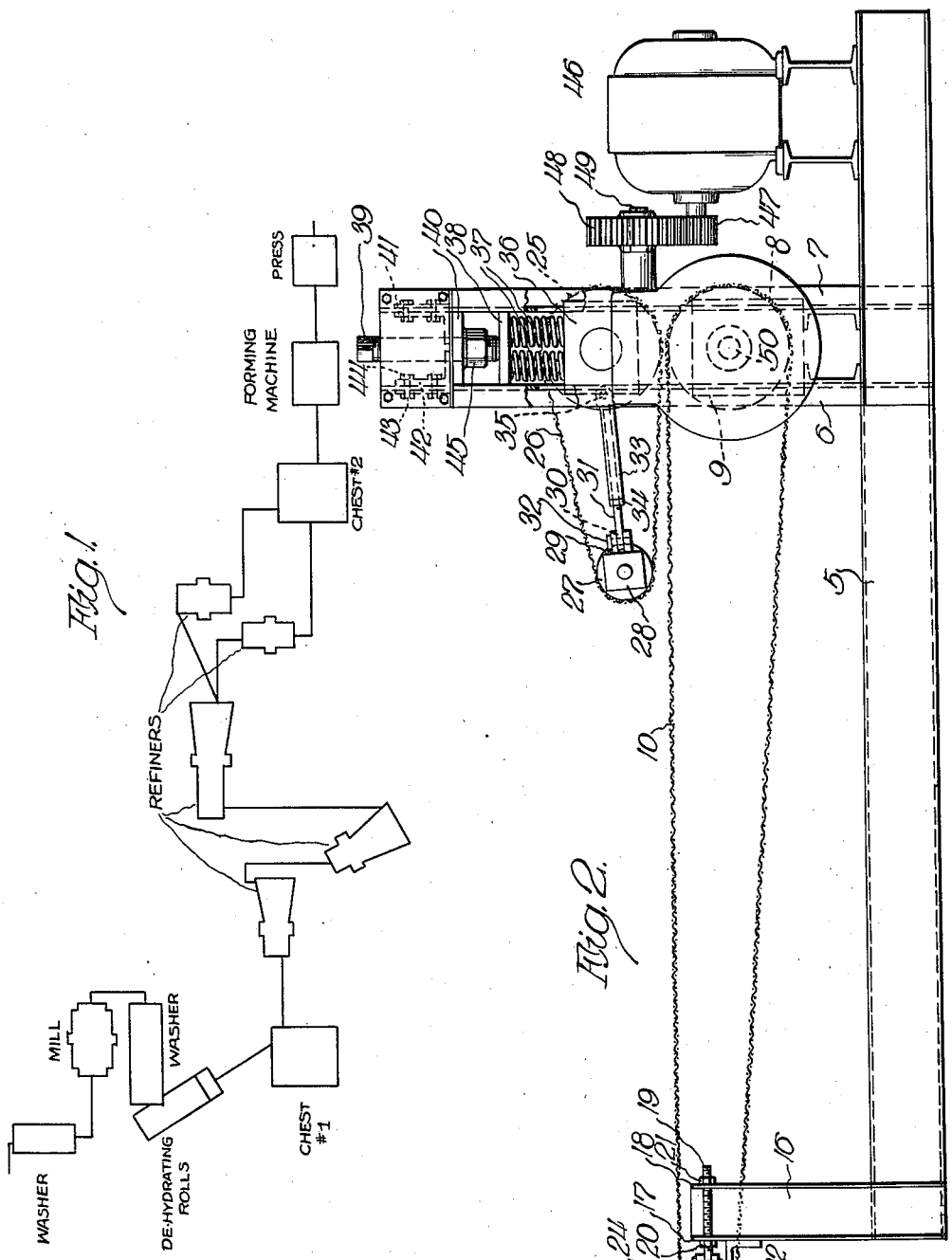

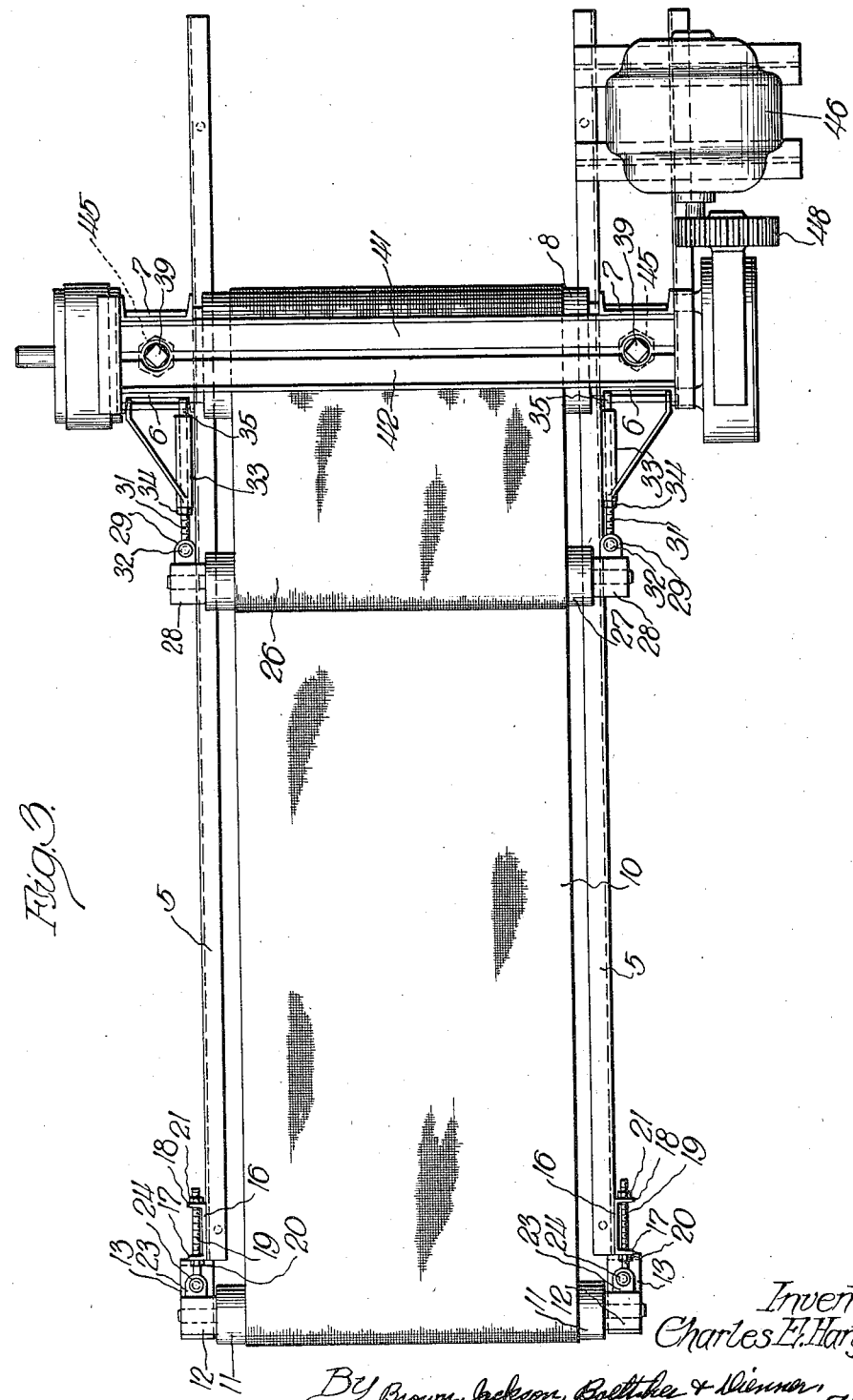

2,019,452

UNITED STATES PATENT OFFICE 2,019,452

PROCESS OF MAKING SYNTHETIC LUMBER

Charles E. Hartford, Dubuque, Iowa, assignor to National Cornstalk Processes, Inc., Chicago, Ill., a corporation of Delaware Application October 10, 1932, Serial No. 637,029

2 Claims. (Cl. 92—39)

This invention relates to the method of manufacturing insulating fibrous material known variously as wall board, fiber board, insulating lumber, synthetic lumber, etc. A wide variety of raw materials are employed in the manufacture of such fibrous boards, such as corn stalks, straw, wood waste, sugar cane bagasse, cotton stalks and spent licorice root, and while the improved method of manufacturing the fiber board that constitutes the subject matter of this application is more particularly concerned with the treatment of corn stalk fiber, it may also be advantageously employed in the treatment of any other suitable material.

Briefly, the usual method of manufacturing fiber board from the above class of materials is to first cut the material into small particles, usually in a dry state. In some processes the cut material is given a cooking treatment, while in other processes such treatment is not practiced. The cooking process, when practiced, may vary from digesting the material under pressure, with chemicals, to merely a hot water cook of the material at atmospheric pressure.

Following the cooking process, or, where this is not practiced, the dry cutting process, the material is subjected to a comminuting process whereby the fibers of the material are torn apart in contact with water solutions, in order to hydrate them with films of water.

After the comminuting and hydrating step the pulp is washed or drained to remove any undesirable products or excessive amounts of fines therefrom, and the material is then run through suitable refining machines which complete the grinding and hydrating of the pulp. The pulp is next formed into a mat on some type of forming machine. From the forming machine the mat is run through heavy squeeze rolls or into a platen press to remove the excess of water. After this, the board is dried by running it through a drier or by heating the platens of the press.

Heretofore, in the manufacture of this class of material, it has been the usual practice to commingle into the board, at some appropriate stage of the process, various materials known as size, to act as a waterproofing agent and to give other desirable properties to the board. It has also been recognized that there would be a greater demand for boards of this type if they had certain other properties, as for example, if they were fireproofed, or if they were rendered resistant to the action of fermenting agents, moulds, or to insect attacks, by the incorporation of suitable chemicals.

In the incorporation of fireproofing materials, or other materials which may be desired, it is generally the case that these materials are water soluble salts or colloidally dispersed materials. In the case of the size, for example, it is first added to the pulp, at some appropriate stage of the process, as a soluble salt, as for example, in the form of sodium rosinate, or it is added as a colloidal emulsion, as for example, a colloidal emulsion of a wax. The sodium rosinate is then precipitated, or the emulsion is coagulated, so that the precipitate clings to or is filtered out by the fibers in the formation of the mat upon the forming machine.

Similarly, in the case of fireproofing, the fireproofing agent may be added to the pulp as a soluble salt, as for example, ammonium phosphate. In this case, only the ammonium phosphate contained in solution in the water remaining in the pulp mat, after it has passed through the press, will be retained within the mat.

As all of the excess water is drained or pressed out of the pulp at the forming machine or at the press, respectively, it will be apparent that a certain amount of the soluble salts used for sizing or for fireproofing, or both, as well as the precipitating agent, will not be retained in the mat but will be carried through the mat in the excess water which is removed therefrom. This excess water containing the soluble salts hereafter will be referred to as "white waters".

Since it is the usual practice to run the pulp into the forming machine containing 96 to 99 per cent of water and to bring it out of the press containing only 70 per cent of water, it will be apparent that a considerable quantity of the dissolved salts will be carried away in the excess white waters. It is further evident that if such excess white waters are discarded, as in present practice, instead of being returned to the process to be used over again, that the chemicals employed will have to be very cheap, or the product will have to command a high price in order to make the process profitable.

Briefly, the present invention, therefore, has for its principal object to provide a process wherein it will be possible, in the manufacture of insulation board, pressed board, wall board, and similar synthetic boards, to return to the process and re-use all of the white waters which are removed from the pulp at the forming machine and at the press.

Another object of the invention is to provide an improved and simplified process which will make it possible, in the manufacture of insulation board, pressed board, wall board, and similar synthetic boards, to incorporate chemicals in the board during the manufacture thereof, and to return to the process and reuse all of the surplus chemicals, pressed out of the board at the forming machine and at the press and which would be lost if any of the white waters were discarded.

A further object of the invention is to provide suitable means for dehydrating the pulp at a certain stage of the process, and thereby to permit of the white waters which are obtained from the pulp at the forming machine and at the press to be recombined with the pulp to restore the proper moisture content thereto for further processing.

A still further object of the invention is to make more economical and practical the manufacture of insulation board, pressed board, wall board, and similar synthetic boards, incorporating such chemicals as emulsified wax, alum, sodium rosinate, ammonium phosphate, zinc chloride, mercuric chloride, copper sulphate, di-nitrophenol, sodium fluoride, as well as sodium arsenate and sodium chromate.

Other objects and advantages of the invention will appear from the following detailed description when taken in connection with the accompanying drawings, in which:

Figure 1 is a flow diagram of the process of the present invention;

Figure 2 is a side elevational view of the means for dehydrating the pulp; and

Figure 3 is a plan view of the means of Figure 2.

To illustrate my process I will now give, as a specific example, the method of incorporating fireproofing salts in the production of cornstalk insulation board of a popular make. It should be understood, however, that the process can be varied widely without departing in any way from the spirit and scope of the present invention, and that it can be used in all processes of the same general type as that of the one which I am about to describe.

In the process of making cornstalk insulation board, the cornstalks are first cut into short pieces and such pieces are then digested in hot water. The pulp formed by the digestion of the cornstalks is then drained to remove the products extracted by the hot water soaking. Following such step the pulp is run through a suitable mill which further comminutes the pulp and hydrates it. The product discharged from this mill is then washed with fresh water and drained on a rotating screen. The pulp then passes into a stock chest, where it is mixed with wax emulsion and fireproofing chemical, and with enough white water to make the pulp the right consistency for further processing. From the first stock chest the pulp is pumped through a plurality of refining machines, to complete the grinding and hydration of the pulp, and it then passes into a second stock chest. In the second stock chest the pulp is mixed with a suitable chemical, such as alum, to coagulate the wax emulsion, and with enough white water to make the pulp the right consistency for use on the forming machine. From this chest the pulp is pumped into a forming machine, and from such machine the formed pulp mat passes into a press, and finally into a drier.

In Figure 1 of the drawings I have shown, in diagrammatic form, the various steps in the production of insulating board by the process of my invention. These steps are substantially the same as the steps of the known process outlined above, except that in the present case I have shown means for dehydrating the pulp, this means being disposed between the second washer and the first stock chest. The purpose of this dehydrating means will hereinafter appear.

In the known process outlined above, the pulp passes from the second washer directly to the first stock chest. This pulp passes from the washer and into the chest, containing approximately 94 per cent water, even though it has been drained on a rotating screen. It is desirable to add most of the white water containing, for example, the sizing of fireproofing salts, in the first stock chest and the balance of the white water in the second stock chest.

This is impractical in the known processes, however, for the reason that the pulp in the first stock chest already contains such a large percentage of water, as hereinbefore pointed out, that if all the white water, which is obtained from the board as it passes from the forming machine and press, is used, as it must be to make the use of fireproofing material practical, it will make the pulp continually more and more dilute, until it becomes unsatisfactory for further processing. It will be perceived, therefore, that in such case it would be necessary to waste some of the white water, together with the fireproofing compound dissolved in the so rejected white water.

This may be further explained by assuming that in the known processes the pulp goes into the forming machine with 97½ percent water, and leaves the press with 70 percent water. This means that every pound of bone dry pulp going into the forming machine contains 39 pounds of water and that every pound of bone dry fiber leaving the press contains 2⅓ pounds of water. This means that 36⅔ pounds of white water are made and recovered from the forming machine and press for every pound of bone dry fiber. However, the washed pulp going into the first stock chest containing about 94 per cent water, as hereinbefore pointed out, has 15⅔ pounds of water per pound of bone dry fiber. For use in the forming machine, the pulp must be diluted until it contains 39 pounds of water per pound of bone dry fiber. Therefore, to dilute the pulp to the proper consistency for use on the forming machine, it would be necessary to add 23⅓ pounds of make-up water per pound of bone dry fiber.

As stated above, it is desirable that most of this water be added in the first stock chest and the balance in the second stock chest. However, it has been shown that every pound of bone dry fiber produces 36⅔ pounds of white water, which is recovered from the forming machine and press, and to add all of this white water to the pulp in the two chests would mean that the pulp would contain 52⅓ pounds of water for every pound of bone dry fiber. This means that the pulp would be made continually more and more dilute until it would become unsatisfactory for processing. It would, therefore, be necessary to discard 13⅓ pounds of the white water that is recovered from the forming machine and press for each pound of bone dry fiber, and to add the remaining 23⅓ pounds of the white water to the pulp to bring it to the desired consistency of 39 pounds of water per pound of bone dry fiber.

Assuming further that in order to get a sufficient amount of dissolved salt into the pressed fibers it would be necessary to have a concentration of 0.04 of a pound of salt per pound of water, it would, therefore, be necessary to discard 13⅓ times 0.04 or 5 3/10 pounds of salt for every pound of treated board produced. This would render almost all commercial applications impractical because of the cost alone. It can readily be seen in the case illustrated by the above example, that the 13⅓ pounds of white water which must be discarded per pound of bone dry fiber would contain wax emulsion, precipitated wax, and alum, as well as the fireproofing salts, and that even in the ordinary practice, when no fireproofing salts are used, large quantities of materials used in sizing the board would be lost in the discarded white waters.

It will be seen, therefore, that to solve the problem of returning to the process and utilizing all of the white waters obtained from the forming machine and the press in the known processes outlined above, it will be necessary for the comminuted and washed pulp to come from the second washing step to the first stock chest with not more than the same amount of water which is contained in the mat finally leaving the press and going into the drier. In other words, some means for dehydrating the pulp must be located after the second washing stage and before the first stock chest, so that the pulp will contain not more than 70 per cent of water or not more than 2⅓ pounds of water per pound of bone dry fiber on passing into the chest. The present invention contemplates the provision of such means as shown diagrammatically in Figure 1 of the drawings.

Any suitable means may be employed for dehydrating the pulp. In Figures 2 and 3 of the drawings I have illustrated a machine for such purpose. This machine comprises a base formed of two parallel I-beams 5. Disposed at substantially one end of each of these beams, and extending upwardly thereabove, are leads 6 and 7, which are spaced apart in the plane thereof. These leads are in the form of channel beams and are suitably secured to the outer sides of the beams 5. These leads are adapted to support a roll 8 suitably journaled in bearing blocks 9, which are secured to said leads in any suitable or preferred manner. A traveling endless belt 10, formed of sturdy wire screen, passes over the roll 8 at one end, by which it is supported, and at its other end passes over a roll 11, which is suitably journaled in bearing blocks 12.

The bearing blocks 12 seat upon brackets 13 to which they are secured by means of bolts 14, these bolts passing through a slot 15 in said brackets and into the under side of the bearing block. The slot 15 permits of the bearing block and bolts 14 being moved longitudinally of the brackets 13 for a purpose which will hereinafter appear.

The brackets 13 are suitably secured to uprights 16, which are in the form of channel beams having flanges 17 and 18. It will be noted that one of these uprights is secured to each of the I-beams 5. The flanges 17 and 18 are bored for the reception of rods 19 which are threaded and provided with nuts 20 and 21. These nuts bear against the outer sides of the flanges 17 and 18 and serve to prevent longitudinal movement of the rods. The ends of the rods adjacent the roller 11 are provided with an eye 22, which extends into a boss 23 suitably formed on the bearing blocks 12. A pin 24 extending downwardly through the boss 23 and through the eye 22 of the rods 19, serves to secure the rods to the bearing blocks. By loosening the nuts 20 and 21, the rods and the bearing blocks may be moved longitudinally of the brackets 13 to vary the tension imposed upon the wire screen 10.

Disposed above the roll 8 in vertical alignment therewith is a similar roll 25, which serves to act as a squeeze roll. This roll also serves to support one end of a traveling wire screen 26, which passes thereover, this screen being superposed, substantially, over the traveling screen 10. At its other end the wire screen passes over a roll 27 which is suitably journaled in bearing blocks 28. These bearing blocks are each provided with a boss 29 which is bored for the reception of an eye 30 formed on one end of a rod 31. A pin 32 passing through the boss 29 and eye 30 of rod 31 serves to secure the rod to the boss.

The rod 31 is threaded for the greater portion of its length and is adapted to telescope into one end of a sleeve 33. A nut 34 threaded on the rod 31 bears against the outer end of the sleeve, thereby preventing inward movement of the rod into the sleeve, and also providing means for adjusting the tension imposed upon the wire screen 26. The other end of the sleeve is pivotally secured at 35 to the leads 6, 7 in any suitable or preferred manner.

The roll 25 is journaled in bearing blocks 36, which are suitably secured in the leads 6, 7 for vertical movement with respect thereto. Springs 37 are secured at one end to the upper surface of the blocks 36 and at their other end are suitably secured to a plate 38. A threaded rod 39 has bearing engagement with the upper surface of the plate 38 and extends upwardly through a plate 40. The plate 40 is suitably secured to angle irons 41, 42 which in turn are secured to the leads 6, 7 by bolts 43 and associated nuts 44. A nut 45 threaded on the rod 39 bears against the under surface of the plate 40. The pressure imposed upon the mat which travels between the rolls 8 and 25 may be varied by adjusting rods 39 by means of nuts 45.

The mechanism for driving the hereinbefore described machine comprises an electric motor 46 carrying a pinion 47 on the shaft thereof, meshing with a spur gear 48 suitably secured to one end of a shaft 49. The other end of the shaft 49 carries a worm gear (not shown) which meshes with a gear (not shown) fixedly secured to the shaft 50 of the roll 8.

In practicing the invention, the above described machine is provided at some point in the process such that the pulp will be delivered at the point where it is desired to add the white water, at not more than the same moisture content of the pulp as it leaves the press.

For example, the dehydrating machine in the present instance is disposed between the second washer and the first stock chest, as shown in Figure 1 of the drawings. The pulp after it leaves the washer is discharged onto the front end of the wire screen 10. This screen carries the pulp to the rear of the machine, where it passes between the screens 10 and 26 which apply a gradual pressure thereto, the pulp finally emerging between the squeeze rolls 8 and 25 and passing into the first stock chest. As the screen rolls are mounted so that the pressure can be varied within limits, the pressure is so adjusted that the proper amount of water is squeezed out of the pulp.

It should be here stated that the traveling screen 10 is provided with side boards mounted upon it in the usual manner, so that when the pulp drops upon the screen the pulp can contain enough water to make it flow freely and leave a comparatively uniform distribution of the pulp over the screen. The water drained off of the screen, however, causes the mat to adhere to and travel to the squeeze rolls.

On emerging from the squeeze rolls the pulp will contain the desired amount of water, that is, 70 per cent or less, or 2⅓ pounds of water per pound of bone dry fiber, if conditions hold as in the hereinbefore described example. It will be apparent that by reason of the pulp being dehydrated until it contains only 70 per cent or less of water upon passing into the first stock chest, all of the excess white water which is removed from a previous amount of pulp going through the forming machine and the press may be returned to and utilized in the two stock chests.

While it has not been found necessary, if desired, the pulp mat may be disintegrated by suitable mechanism as it comes from the dehydrating rolls, in order to tear it into small particles for the subsequent operations. The pulp passes from the dehydrating press to the first stock chest, where it is mixed with the necessary amount of white water to bring it back to its proper consistency, this white water being a part of the excess white water removed from a previous amount of pulp passing through the forming machine and the press. The pulp containing such white water is then pumped through the series of refining machines and into the second stock chest. In this chest the balance of the white water removed from the previous amount of pulp passing through the forming machine and press is added, together with any small quantity of fresh water which may be required to maintain the proper consistency of the pulp. From the second stock chest the pulp is then passed on to the forming machine and thence into the press, where the excess of the white water is drained or pressed out and returned to the two stock chests, by any suitable means, to be used over again.

I have found that in the above described process the procedure of dehydrating the pulp previous to adding the white waters gives a more thorough washing, gives a pulp which is freer, works more satisfactorily on the forming machine, and in particular forms a stronger board for a given weight.

What I claim as my invention is:

1. The process of manufacturing synthetic lumber from fibrous material by forming a pulp from the material and treating it with chemical solutions and then forming the treated pulp into a thick layer and passing it through a forming machine and press and there removing the excess solutions from the treated pulp, which comprises first mixing the fibrous material with water to form the pulp to be treated, removing from the pulp thus formed water in such amount that the water content of the pulp to be treated is not in excess of the water content of the treated pulp after passage of the latter through the forming machine and press, mixing and treating the dewatered pulp with water and chemical solutions to bring such dewatered pulp back to its proper consistency for further processing, and returning to the system for use in the treatment of additional untreated pulp the water and chemical solutions removed from the treated pulp in the passage of the latter through the forming machine and press.

2. The process of manufacturing synthetic lumber from fibrous material by forming a pulp from the material and treating it with chemical solutions and then forming the treated pulp into a thick layer and passing it through a forming machine and press and there removing the excess solutions from the treated pulp, which comprises first mixing the fibrous material with water to form the pulp to be treated, forming the pulp thus obtained into a thick mass or layer and removing therefrom by pressure water in such amount that the water content of the pulp to be treated is not in excess of the water content of the treated pulp after passage of the latter through the forming machine and press, discarding the water thus extracted from the untreated pulp, passing the dewatered pulp into a stock chest, collecting the chemical solutions removed from the treated pulp in the passage of the latter through the forming machine and press and returning a portion of such solutions to said stock chest to be commingled with the dewatered pulp therein, mixing the pulp in the stock chest with any chemicals desired, further refining the pulp obtained from the stock chest, passing the refined pulp into a second stock chest, mixing the pulp in the second stock chest with any additional chemicals desired, and returning to the second stock chest and commingling with the pulp therein the balance of the chemical solutions removed from the treated pulp in the passage of the latter through the forming machine and press.

CHARLES E. HARTFORD.